United States Patent [19]
Smithson et al.

[11] Patent Number: 5,647,553
[45] Date of Patent: Jul. 15, 1997

[54] LIFTING REEL ASSEMBLY WEB CLAMPING RETRACTOR

[75] Inventors: Alan George Smithson; Brian Edward Aiston; Joseph Patrick Harte; Kenneth Williamson, all of Cumbria, United Kingdom

[73] Assignee: AlliedSignal Ltd., Carlisle, United Kingdom

[21] Appl. No.: 581,026

[22] Filed: Dec. 28, 1995

[51] Int. Cl.⁶ .................................................. B60R 22/42
[52] U.S. Cl. ................................ 242/381.1; 242/382.6
[58] Field of Search ........................... 242/381.1, 382.6, 242/381.4; 280/806; 297/478, 480

[56] References Cited

U.S. PATENT DOCUMENTS

| | | | |
|---|---|---|---|
| 4,394,034 | 7/1983 | Murphy et al. | 242/381.4 |
| 4,492,348 | 1/1985 | Ziv et al. | 242/381.1 |
| 4,899,949 | 2/1990 | Meyer et al. | 242/381.1 |
| 4,949,995 | 8/1990 | Haland | 242/381.4 |
| 4,997,140 | 3/1991 | Doty | 242/382.6 |
| 5,511,741 | 4/1996 | Zolkower et al. | 242/381.1 |

*Primary Examiner*—John M. Jillions
*Attorney, Agent, or Firm*—Markell Seitzman

[57] ABSTRACT

A web clamping retractor comprising: a stationary frame (12) and a reel assembly (14), the reel assembly includes a mounting member (22) that is slidingly mounted to the frame via a U-shaped needle member (150). An upper leg (154) of the U-shaped needle member functions as an activation bar to move a clamping wedge (49a) into clamping engagement about a seat belt (19) after a spool or reel member has been pre-blocked. The lower leg (18) of the U-shaped needle member serves as a shaft about which the reel rotates.

4 Claims, 5 Drawing Sheets

LIFTING REEL ASSEMBLY WEB CLAMPING RETRACTOR

BACKGROUND AND SUMMARY OF THE INVENTION

The present invention relates to a seat belt retractor and more particularly a lifting reel assembly web clamping retractor.

Accordingly the invention comprises: a stationary frame and a reel assembly, the reel assembly includes a mounting member that is slidingly mounted to the frame via a U-shaped needle member. An upper leg of the U-shaped needle member functions as an activation bar to move a clamping wedge into clamping engagement after a spool or reel member has been pre-blocked. The lower leg of the U-shaped needle member serves as a shaft about which the reel rotates.

Many other objects and purposes of the invention will be clear from the following detailed description of the drawings.

DETAILED DESCRIPTION OF THE DRAWINGS

Figure 1:
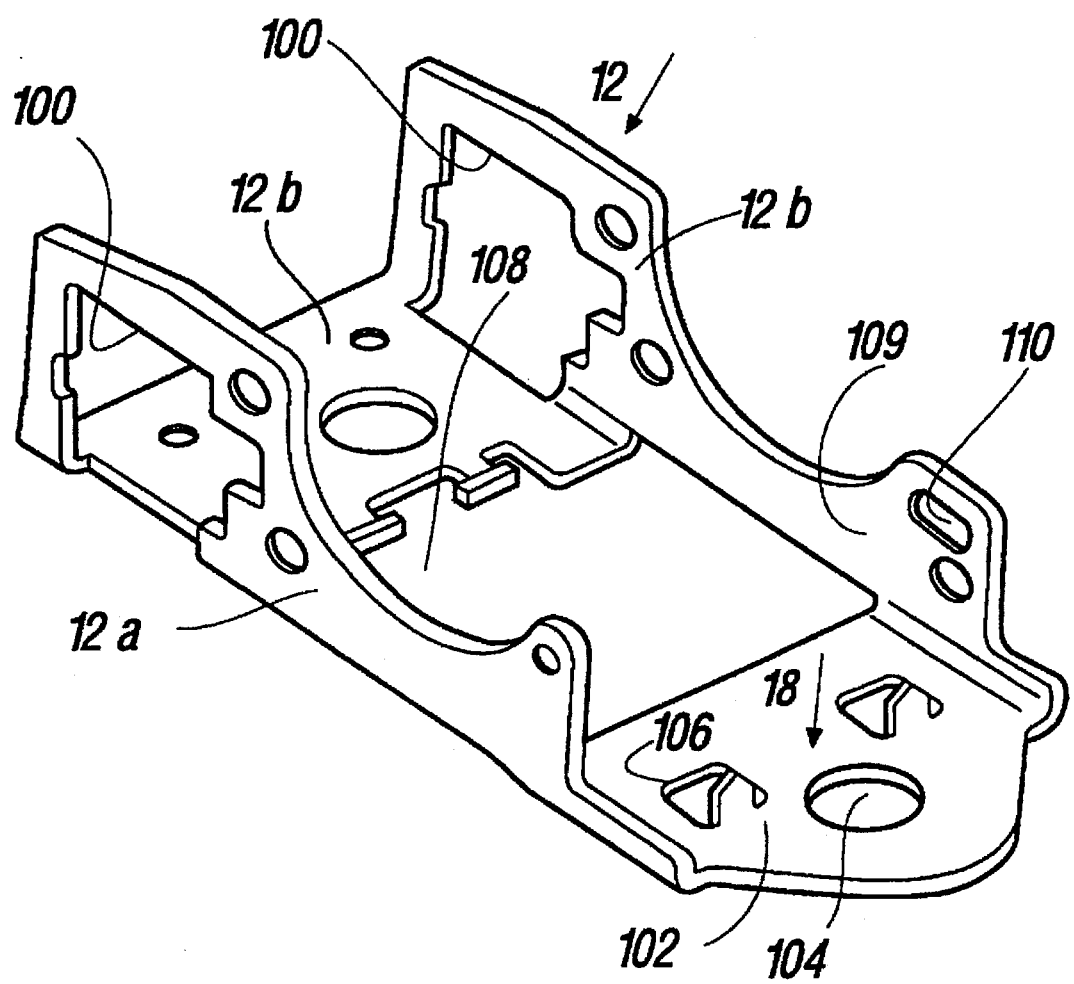
FIG. 1 is an isometric view of a frame.

FIG. 1 is an isometric view of the stationary frame 12 and comprises sides 12a and 12b and a back 12c. The upper portion of the frame includes a plurality of openings 100 to receive a web clamping mechanism 46. This web clamping mechanism 46 comprises a wedge housing 47 and two movable wedges 49a,b. The motion of the wedges 49a,b is synchronized with integral molded pins 53 (only one of which is visible) and biased apart by springs 55. The wedge housing 47 is held within the opening 100 by a spacer bar 47a which includes a web (seat belt) guide slot 47b. The lower portion 102 of the frame 12 includes a mounting hole 104 and anti-rotation projections 106 which are known in the art. The center or back portion 12c of the frame 12 includes a plurality of bosses 108 which slidingly engage and secure complementary members 107 in the back part 22c of a mounting member 22 of a reel assembly 14 shown below (see FIGS. 2 and 3) to enable the reel assembly to slide on the frame 12. The lower end 109 of the side 12b of the frame includes an elongated slot 110 through which a peg 190 of the reel assembly is received, thereby providing another means for slidably securing the mounting member 22 to the stationary frame 12.

Extending from each of the sides is a stationary panel or bushing which can be viewed as an extension of the frame sides 12a,b. Situated on the left hand frame side 12a is a mechanism bushing 164. This bushing 164 is attached to frame side 12a. The mechanism bushing includes an oval slot 160b which overlays slot 160" in frame side 12a. The bushing mechanism also includes an opening 174b in its middle through which a stub axle 170a of the spool 16 extends. Located at the lower end of the bushing 164 is an open cavity 211 to slidingly receive the walled housing 210 of the sensor mechanism.

Figure 4:
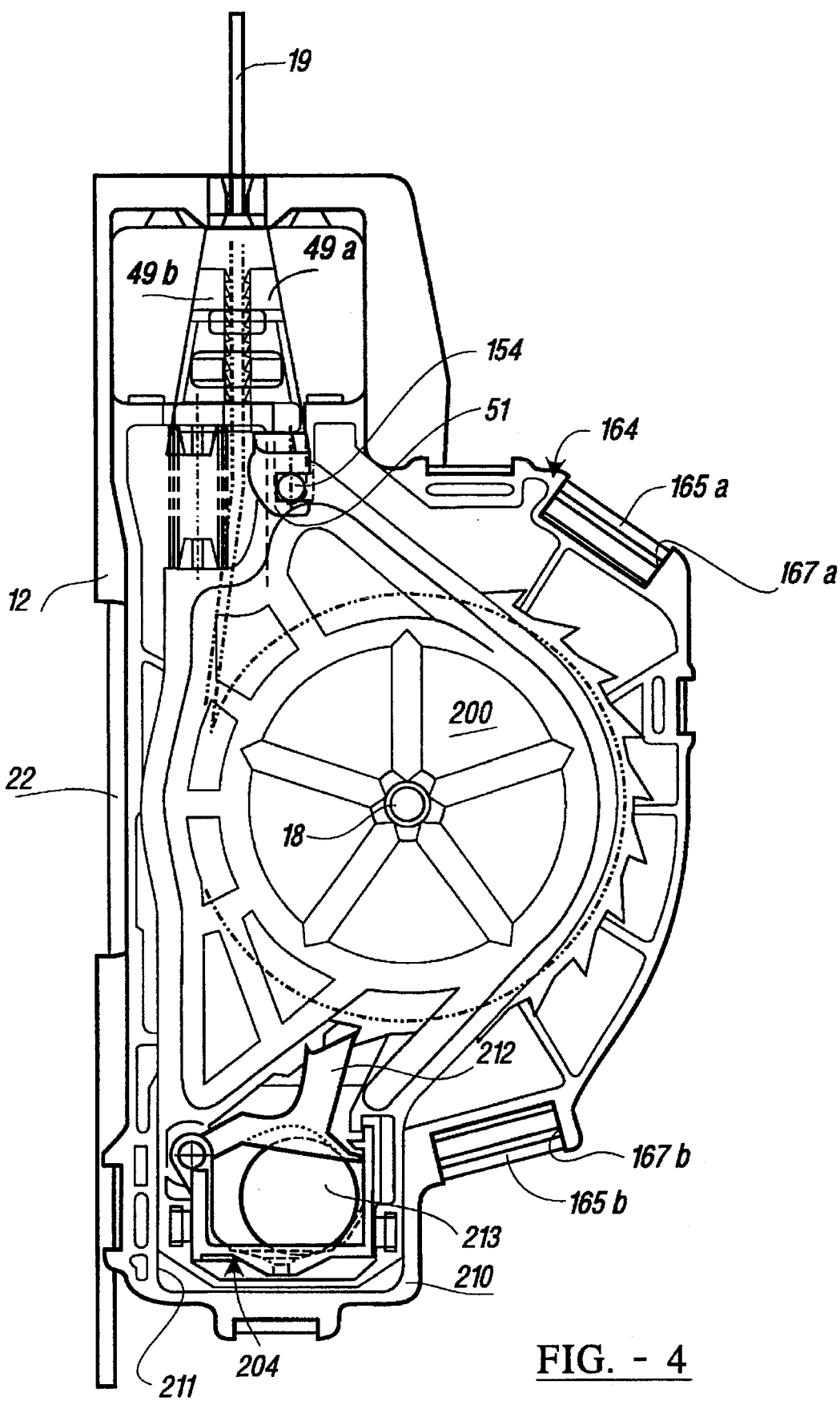
FIG. 4 is a sensor mechanism in a pre-blocking condition.
Figure 5:
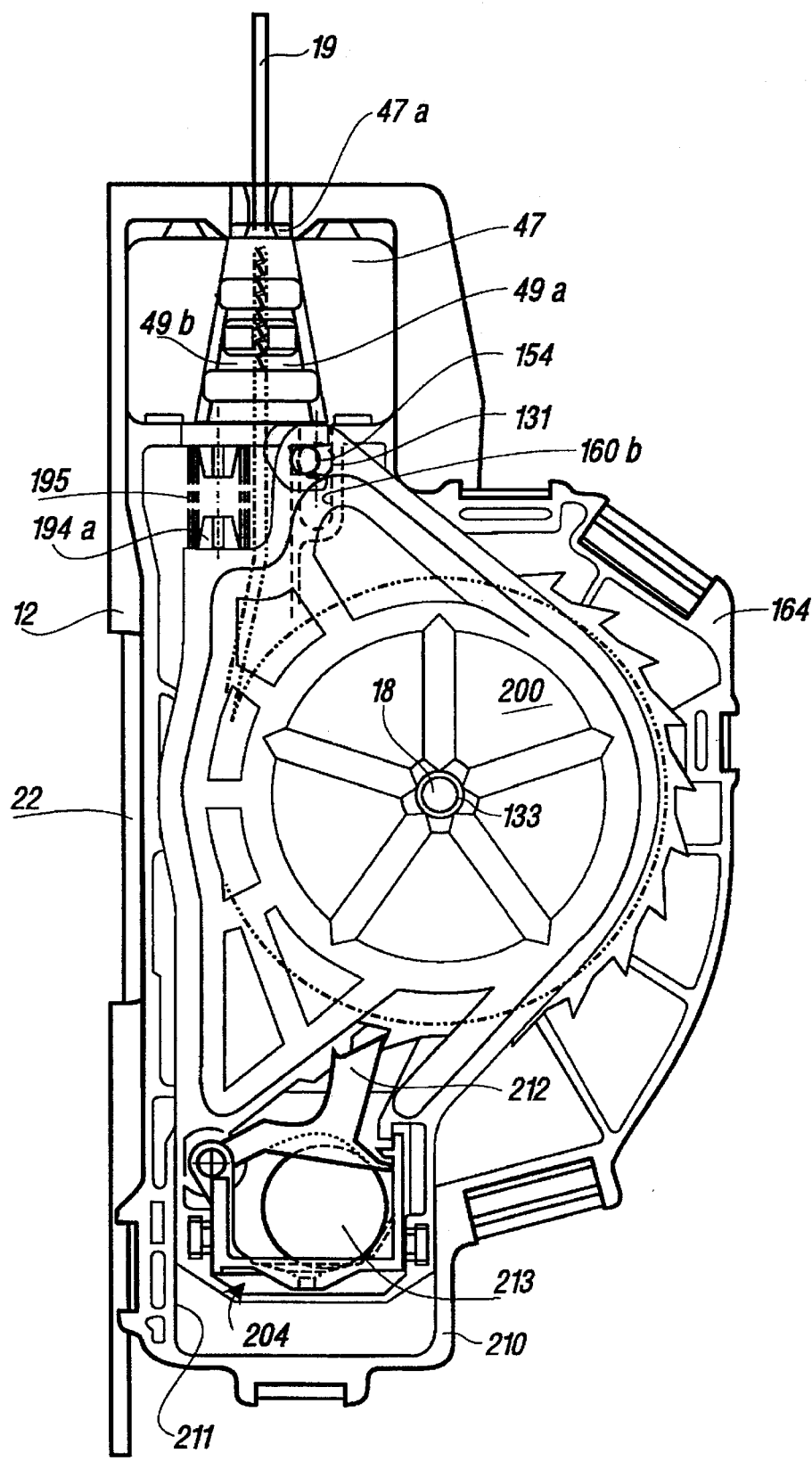
FIG. 5 shows the reel assembly in a vertically raised position.

Situated on the right-hand frame side 12b is a spring bushing 162 which is also referred to as an inner spring cover. This cover includes an oval slot 160a adjacent the oval slot 160" of the frame side 12b. The spring inner cover or bushing 162 includes a vertical oval slot 174a through which a stub axle 170 extends. This stub axle includes a slot 171 to receive an inner end of a rewind spring 178 and functions as a spring arbor. The bushings 162 and 164 are tied together by cross members 165a,b that fit in grooves 167a,b as shown in FIGS. 4 and 5.

Figure 2:
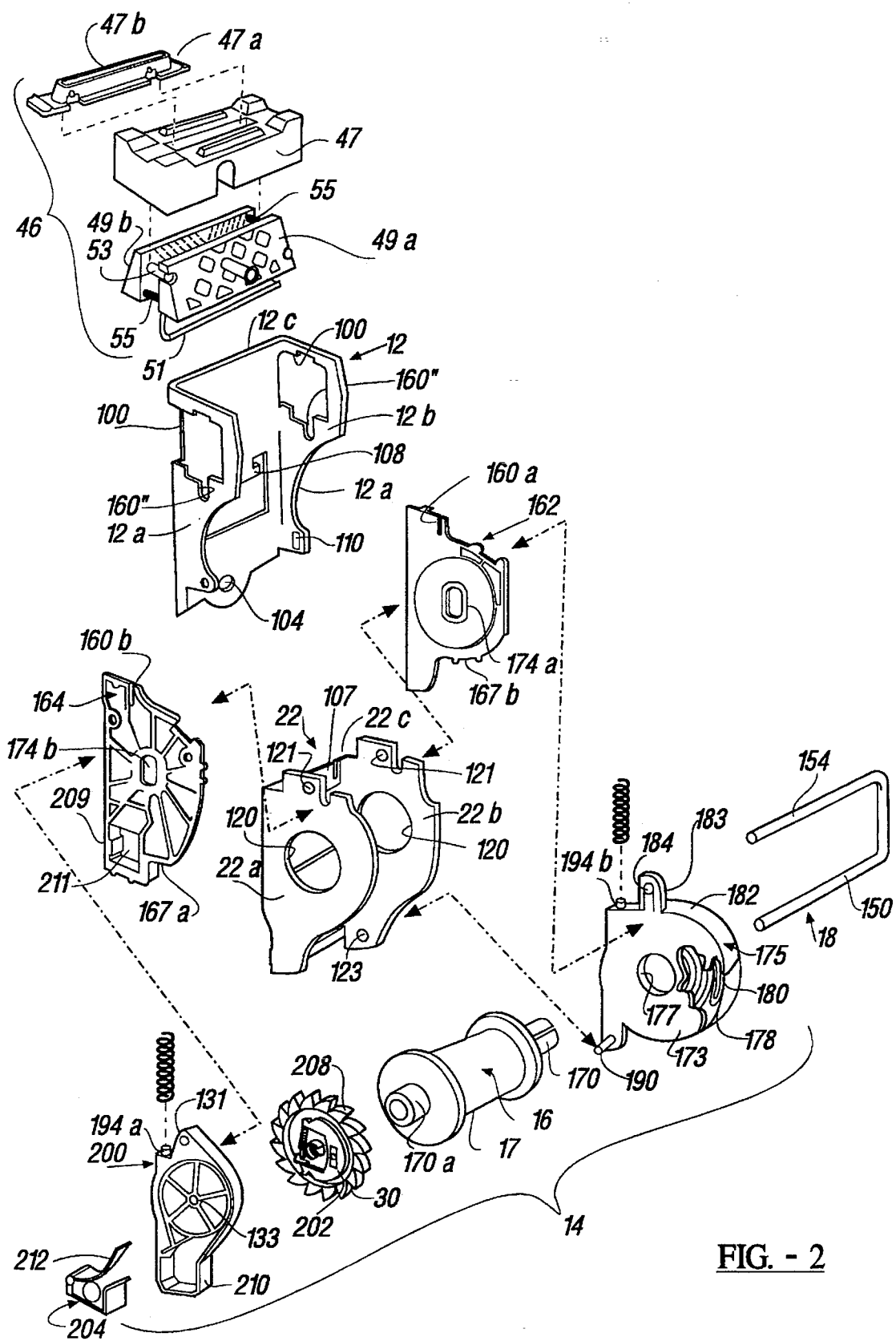
FIG. 2 is an assembly view showing many of the major features of the present invention.
Figure 3:
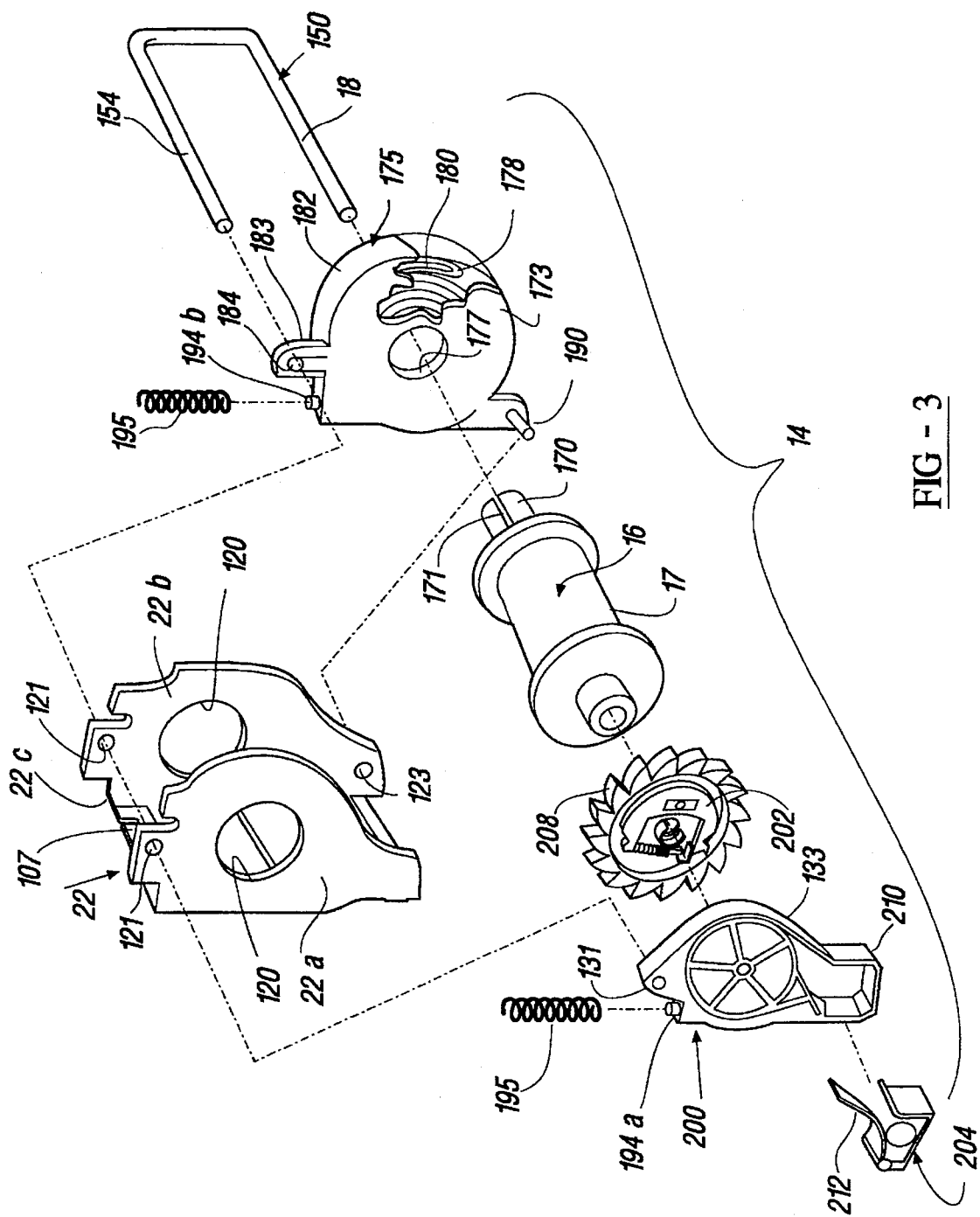
FIG. 3 is an enlarged isometric view of a reel assembly.

The reel assembly 14 is shown in greater detail in FIGS. 2 and 3. The reel assembly 14 comprises: the mounting member 22, the spool or reel 16, a spring cup 175 (having a rewind spring 178 therein), a U-shaped needle 150 having a top (actuator bar) 154, center and lower (shaft) legs 18 and a sensor mechanism 200 which includes a web sensor 202, a vehicle sensor 204 and a tooth ratchet wheel 208 fixed to the reel 16 which provides information to lock the ratchet wheel and hence the reel from further rotation. The tips or ends of the upper and lower legs of the U-shaped needle are serrated or knurled and are tightly received into openings 131 and 133 within the sensor mechanism.

The mounting member 22 includes two sides 22a,b and an upper back portion 22c and a lower back portion 22d. The upper portion of the back portion includes a sliding link or protrusion 107 that slidingly engages the cooperating part 108 in the center of the back 12c of the stationary frame 12. The interlinking of the frame and mounting member can also be achieved using bosses or rivets extending from the frame that are received in slots in the mounting member. Each of the sides 22a,b of the mounting member includes a central opening 120 to receive the spool or reel 16. Each side 22a,b also includes a small opening 121 through which the upper leg (actuator bar) 154 of the U-shaped needle extends thereby linking the two sides 22a,b together. The lower end of the right-hand side 22b of the mounting member also includes another small opening 123 through which a peg or pin 190 extends from the spring cup 175.

The sensor mechanism 200 is a multi-purpose part. Situated at the lower end of the mechanism is a walled housing 209 which defines a cavity 211 in which is placed a part of the sensing mechanism housing the vehicle sensor 204. This vehicle sensor includes a pivoted pawl 212 and an inertia mass 213. During an emergency the mass is moved and raises the pawl causing it to engage the teeth 30 (to achieve a pre-blocking condition) of the ratchet wheel 208 thereby preventing further rotation of the reel 16.

The spool or reel 16 includes a center portion 17 about which the seat belt 19 is wound. The stub axle 170 and stub axle 170a extend from this center part 17. The spool or reel is hollow and the lower leg 18 of the U-shaped needle extends therethrough. The spool rotates about this lower leg.

The spring cup 175 includes a back plate 173 and a generally circular rim 182. The rewind spring 178 is received within the space defined by the back plate and the rim. The lower end of the plate includes the extending peg or pin 190 which is received with the small opening 123 in the lower end of the right-hand side 22b of the mounting member in a generally known manner. The outer end of the rewind spring 178 is looped about a projection 180 formed in the spring cup 175. The spring cup also includes an opening 177 through which the spring axle 170 extends. The spring cup 175 also includes, on or near its top, an extension 183 which includes an opening 184 through which the upper leg of the U-shaped needle extends. The spring cup includes an upstanding boss or projection 194b to receive a biasing spring 195 to push or bias the reel assembly downward. A similar boss or projection 194a is located on a portion of the sensor mechanism for another spring 195.

The lower leg 18 of the U-shaped needle defines the shaft 18 and provides bearing surfaces about which the spool rotates. The top leg 154 of the U-shaped needle 18 extends through the openings 160", 160" in the frame, as well as narrow guide slots 160a in a spring inner cover 162 (on the right-hand side of the retractor) and slot 160b in a mechanism bushing 164 (on the left hand side of the retractor).

As can be seen, the peg 190 physically joins the lower end of the right side 22b of the mounting member 22 to further ensure that the spring cup 175, the U-shaped needle 150 and the mounting member 22 move together as an assembly. The rewind spring is covered by an outer cover and the sensor mechanism is also covered by another outer cover (both of which are not shown). The left-hand ends of the upper and lower legs of the U-shaped needle are received within openings 131 and 133 of the sensor mechanism 200.

As can be appreciated, the spring cup 175 is restrained to slide only vertically within the guide slot 160a with the upper leg 154. The lower part of the spring cup 175, by virtue of the use of the peg 190 and oval hole 110, can also only slide vertically. The motion of the left-hand portion of the winding mechanism is similarly restrained to achieve only a sliding vertical movement. This is achieved, as the upper leg 154 of the U-shaped pin is received through the vertically oriented guide opening 160b in the mechanism bushing, thereby restraining the upper portion of the sensor mechanism 200 to move vertically. The lower portion of the sensor mechanism, and in particular the housing 210 (in which the vehicle sensor is located), slides against vertical guide walls of the cavity 211 formed within the mechanism bushing. Again, by restraining the sensor mechanism at two locations, both of which only provide for sliding vertical movement, the left-hand portion of the winding mechanism is similarly restrained.

Returning briefly to FIGS. 1 and 2, as mentioned the frame 12 includes two sides 12a,b and a rear part 12c. Each side 12a,b includes a square shaped opening into which is placed the web clamping mechanism 46. The front wedge 49a includes a semi-circular, open groove 51 into which the upper leg 154 of the U-shaped needle 18 is secured to provide for a positive engagement between the upper leg and this wedge. The rear wedge 49b is selectively engaged and lifted by a rear portion of the mounting member as it moves vertically.

During assembly, the various parts of the retractor reel assembly 14 are positioned relative to parts of the frame 12 and the bushings 162, and 164 as follows:

The mounting member 22 is placed between each of the bushings 162, 164 and the reel 16 placed through the respective opening in the sides 22a,b of the mounting member 22 with the integral spring axle 170 extending through the oval opening 174a in the spring inner cover 162. The spring cup 175 is placed against the outside surface of the spring inner cover (spring bushing) 162 with its peg 190 extending through the oval opening 110 in the lower end of the right-hand side of the frame 22b. This peg extends through the mating opening 123 in the side 22b of the mounting member 22. In this configuration the return spring 178 is attached to the spring arbor portion of the reel 16 and to the spring cup 174. The upper leg 154 of the U-shaped needle 150 is inserted through the opening 184 in the spring cup, the opening 160a in the spring inner cover 162, the opening 160" in the right-hand side 12b of the frame, through the opening 121 in the right-hand side of the mounting member, through the groove 51 of the front wedge 49a, and the opening 121 on the left side of the mounting member 22a, the opening 160" in the frame, the opening 160b in the mechanism bushing 164 and the opening 131 in the sensor mechanism 200. The lower leg of the U-shaped needle is inserted through the spring axle (which already extends into the spring cup 174 and through the other parts of the reel and through the opening 133 in the mechanism bushing 164. With the ends of the upper and lower legs 154 and 18 of the U-shaped needle 150 attached to the sensor mechanism 200, the sensor housing 210 will be positioned within the cavity 211 formed in the mechanism bushing 164. The outer covers are fitted to the bushings to protect the sensor mechanism 200 and spring 178.

During an emergency, one or the other of the inertial sensors, the web or vehicle sensor locks with the ratchet wheel pre-blocking (locking, preventing) the reel 16 from further rotation (see FIG. 4). With the reel now pre-blocked, the reel assembly is vertically lifted as forces are applied to the seat belt 19. As the reel assembly is lifted the upper leg 154 of the U-shaped needle 158 lifts the front wedge 49a initiating the clamping of the seat belt 19. The rear of the mounting member 22 may also be in contact with the rear wedge 49b and lifts this wedge as well. FIG. 5 shows the reel assembly 14 in its lifted position and the wedges 49a,b clamped about the seat belt (webbing) 19.

Many changes and modifications in the above described embodiment of the invention can, of course, be carried out without departing from the scope thereof. Accordingly, that scope is intended to be limited only by the scope of the appended claims.

We claim:

1. A web clamping retractor comprising:

a stationary frame (12), web clamp supported relative to the frame and movable to a clamping position, in clamping engagement with a portion of a seat belt, from a free position in which the seat belt is movable relative to the web clamp and a reel assembly (14) having a spool, the seat belt wound thereabout and operatively positioned relative to the web clamp and a means for pre-blocking the spool, the reel assembly includes a mounting member (22) that is slidingly mounted to the frame via a U-shaped needle member (150); an upper leg (154) of the U-shaped needle member functions as an activation bar to move the web clamp into clamping engagement about the seat belt (19) after the spool has been pre-blocked; a lower leg (18) of the U-shaped needle member defines a shaft about which the reel rotates.

2. The retractor as defined in claim 1 wherein the upper leg of the needle member and the web clamp are physically linked together and wherein the retractor further includes at least one bias spring to bias the reel assembly providing a means for moving the web clamp to its free position.

3. A web clamping retractor comprising:

a frame;

web clamp supported relative to the frame and movable to a clamping position, in clamping engagement with a portion of a seat belt, from a free position in which the seat belt is movable relative to the web clamp; and a reel assembly having a spool, with the seat belt wound thereabout and a means for pre-blocking the spool, the reel assembly slidingly mounted to the frame via a U-shaped needle member; an upper leg of the U-shaped needle member functions as an activation bar to move the web clamp into clamping engagement about the seat belt after the spool has been pre-blocked; a lower leg of the U-shaped needle member serves as a shaft about which the spool rotates.

4. The retractor as defined in claim 3 wherein the upper leg of the needle member and the web clamp are physically linked together and wherein the retractor further includes at least one bias spring to bias the reel assembly providing a means for moving the web clamp to its free position.

* * * * *